US012729105B1

(12) United States Patent
Lai

(10) Patent No.: US 12,729,105 B1
(45) Date of Patent: Sep. 8, 2026

(54) LIQUID PUMPING DEVICE AND LIQUID REFILLING APPARATUS

(71) Applicant: ZHONGSHAN PEILI TECHNOLOGY CO., LTD., Zhongshan (CN)

(72) Inventor: Chunlai Lai, Ruijin (CN)

(73) Assignee: ZHONGSHAN PEILI TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 19/396,681

(22) Filed: Nov. 21, 2025

(30) Foreign Application Priority Data

Oct. 24, 2025 (CN) ........................ 202522261619.4

(51) Int. Cl.

*B67D 7/68* (2010.01)
*B67D 7/00* (2010.01)
*B67D 7/16* (2010.01)
*B67D 7/62* (2010.01)
*F16L 3/13* (2006.01)
*F16L 5/00* (2006.01)

(52) U.S. Cl.

CPC ............... *B67D 7/68* (2013.01); *B67D 7/002* (2013.01); *B67D 7/16* (2013.01); *B67D 7/62* (2013.01); *F16L 3/13* (2013.01); *F16L 5/00* (2013.01)

(58) Field of Classification Search

CPC ... F16L 35/00; F16L 39/04; F16L 3/00; F16L 3/08; F16L 3/12; F16L 3/13; F16L 25/0036; F16L 25/0045; F16L 27/12–1273; F16L 33/02; F16L 33/03; F16L 33/32; F16L 2/185

USPC ........ 138/121, 106; 220/326, 784, 799, 709; 215/216

See application file for complete search history.

(56) References Cited

U.S. PATENT DOCUMENTS 4,570,833 A * 2/1986 Vanderjagt ............ F04B 53/106 417/269
4,711,472 A * 12/1987 Schnell ................ H02G 3/0468 174/665
5,094,482 A * 3/1992 Petty ................... F16L 37/0985 285/903
5,150,930 A * 9/1992 Petty ................... B29C 45/4407 285/903
D332,481 S * 1/1993 Petty ............................ D23/262
7,121,433 B2 * 10/2006 Nelson .................. F04D 13/024 417/420

(Continued)

*Primary Examiner* — Paul R Durand
*Assistant Examiner* — Randall A Gruby
(74) *Attorney, Agent, or Firm* — HOWARD M COHN and Associates, LLC

(57) ABSTRACT

The present disclosure discloses a liquid pumping device and a liquid refilling apparatus, where the liquid pumping device includes: a pump body conFIGured to be disposed within a container for pumping liquid from the container; a pipe connected to the pump body for transporting the liquid; a grip portion connected to a distal end of the pipe away from the pump body, wherein the grip portion is connected to the pump body and is capable of controlling the pump body; and a mounting portion mounted on the pipe, wherein the mounting portion and the pump body are positioned at different locations along the pipe, the length of a pipe segment between the mounting portion and the pump body is variable, the mounting portion is conFIGured to be detachably mounted on the container.

17 Claims, 4 Drawing Sheets

(56) References Cited

U.S. PATENT DOCUMENTS

| | | | | |
|---|---|---|---|---|
| 11,466,689 | B1 * | 10/2022 | Lai | F04D 29/086 |
| 11,898,697 | B1 * | 2/2024 | Park | F16N 37/00 |
| 12,145,836 | B1 * | 11/2024 | Lai | B67D 7/04 |
| 12,319,559 | B1 * | 6/2025 | Lai | B67D 7/62 |
| 12,589,400 | B1 * | 3/2026 | Lai | B05B 9/0426 |
| 2006/0039800 | A1 * | 2/2006 | Saunders | B63B 13/00<br>417/234 |
| 2014/0151514 | A1 * | 6/2014 | Asai | F16L 3/08<br>248/74.1 |
| 2022/0120293 | A1 * | 4/2022 | Henton | F04D 13/08 |
| 2025/0361868 | A1 * | 11/2025 | Eades | F04D 13/068 |

* cited by examiner

LIQUID PUMPING DEVICE AND LIQUID REFILLING APPARATUS

TECHNICAL FIELD

The present disclosure relates to the technical field of liquid refilling tools, and more specifically, to a liquid pumping device and a liquid refilling apparatus.

BACKGROUND

In the field of liquid pumping devices, normal designs typically connect the pump body to external operating components via a pipe of fixed length. This structural approach proves inadequate when addressing containers of varying depths. An excessively long pipe may become entangled or kinked within shallow containers, hindering operation and risking structural damage, while an overly short pipe fails to reach the bottom of deep containers, leaving residual liquid unextracted and causing waste. Furthermore, current liquid pumping devices often lack universal and convenient mounting solutions. They typically rely on specific threaded connectors or mounting bases to attach to container perforated openings, yet commercial containers exhibit significant variations in perforated opening dimensions and specifications. Consequently, a single pump frequently requires multiple adapter fittings, increasing both cost and operational complexity. In cases where suitable connectors are unavailable, the liquid pumping device struggles to achieve secure fixation on the container, causing the pump body to vibrate or detach during operation. This compromises the stability and safety of the pumping process while posing operational inconvenience for users.

SUMMARY

The present disclosure provides a liquid pumping device capable of adjustably accommodating containers of varying depths and incorporating a universal mounting mechanism, thereby enhancing operational stability and safety during the liquid pumping process.

In a first aspect, the present disclosure provides a liquid pumping device, including:

- a pump body configured to be disposed within a container for pumping liquid from the container;
- a pipe connected to the pump body for transporting the liquid;
- a grip portion connected to a distal end of the pipe away from the pump body, wherein the grip portion is connected to the pump body and is capable of controlling the pump body; and
- a mounting portion mounted on the pipe, wherein the mounting portion and the pump body are positioned at different locations along the pipe, the length of a pipe segment between the mounting portion and the pump body is variable, the mounting portion is configured to be detachably mounted on the container.

Optionally, the mounting portion is movably connected to the pipe, and the mounting portion is capable of being relatively moved along the pipe to be positioned at different locations.

Optionally, the mounting portion includes a connecting portion and a clamping portion interconnected with each other. The connecting portion is movably connected to the pipe, and the clamping portion clamps the container.

Optionally, the clamping portion is configured to clamp an annular wall surrounding an outlet of the container.

Optionally, the connecting portion is sleeved over the pipe and slidable relative to the pipe. The connecting portion includes at least one spring tab, and the spring tab elastically abuts the pipe to form a snap-fit engagement.

Optionally, the connecting portion includes a sleeve portion and the spring tab. The sleeve portion is sleeved over the pipe and defines perforated openings therein, and the spring tab is configured within the perforated openings and has one end connected to the sleeve portion Optionally, the pipe includes a plurality of positioning grooves along its longitudinal direction, the spring tab has a snap-fitting portion protruding towards the pipe from the other end, and the engagement protrusion is configured to snap into different positioning grooves to position the mounting portion at various locations along the pipe.

Optionally, the mounting portion further includes a flexible cover connected to the connecting portion, the flexible cover surrounds the connecting portion and is configured to enclose the container's outlet.

Optionally, the mounting portion further includes a handle connected to the connecting portion. The handle is configured to drive the mounting portion to slide under external force.

Optionally, the mounting portion is detachably mounted on the pipe, enabling removable installation and securement at any position along the pipe.

Optionally, the pipe comprises an expandable portion between the mounting portion and the pump body, the expandable portion having an adjustable length.

Optionally, the grip portion comprises an operating lever and an automatic control circuit. The operating lever is manually operable by external force to control the opening and closing of the liquid-transporting pipeline, and the automatic control circuit is configured to automatically start/stop the pump body.

Optionally, the grip portion further includes a control switch configured to be triggered by an external force to control the operating state of the liquid pumping device, and the operating state includes a working state and a stopped state.

Optionally, the grip portion includes a grip and a base connected to the pipe via the grip. The operating lever is movably mounted on the base, the operating lever and the grip are both located on the same side of the base, and the control switch is configured on the base and proximate to the grip.

Optionally, the grip portion further includes a liquid refill tube for outputting liquid, the liquid refill tube is connected to a side of the base away from the grip, the automatic control circuit includes a control circuit and a sensor electrically connected to the control circuit, the sensor is installed at a front end of the liquid refill tube and configured to detect the quantity of liquid output, and the control circuit controls the start and stop of the pump body based on the detected liquid quantity.

In a second aspect, the present disclosure also provides a liquid refilling apparatus, including:

- a container for storing liquid; and
- a liquid pumping device as described above, wherein the liquid pumping device is mounted on the container and configured for outputting liquid from the container.

Optionally, the container defines an outlet and an annular wall surrounding the outlet and protruding outward, and the mounting portion of the liquid pumping device clamps the annular wall.

The present disclosure provides a liquid pumping device. The pump body is configured to pump liquid from a container, and the pipe serves as a liquid-transporting pipeline to guide the pumped liquid outside the container. The grip portion is connected to a distal end of the pipe away from the pump body. This configuration not only provides a convenient holding point for the user but also enables direct or indirect control over the pump body's activation, deactivation, and operational status through functional interaction. The liquid pumping device further includes a mounting portion spaced apart from the pump body along the longitudinal direction of the pipe. The effective length of the pipe segment between the mounting portion and the pump body is variable. This variable length feature allows users to flexibly adjust the pump body's insertion depth into the container during operation. Regardless of the container's depth, the pump body can be adjusted to reach target positions such as the container bottom, to ensure efficient liquid pumping while avoiding incomplete extraction or air ingress caused by pump body suspension. Additionally, the mounting portion is detachably mounted on the container, such as by clamping or other methods achieving temporary yet rigid fixation. This design introduces an extra stability support point for the pumping device. When synergized with the grip portion, it effectively prevents the pump body displacement or collision with the container during pumping caused by pipe movement. Furthermore, the detachable mounting mechanism simplifies the assembly/disassembly process. When switching containers or relocating the pumping position, users can quickly detach the liquid pumping device from the current container, significantly enhancing usability and operational efficiency.

A flexible cover is disposed at a front end of the mounting portion, encircling the connecting portion. The flexible cover surrounds the container's outlet to prevent liquid splashing and evaporation.

BRIEF DESCRIPTION OF DRAWINGS

To facilitate a clear understanding of the technical solutions in the embodiments of the present disclosure, the figures required for describing the embodiments will be briefly introduced below. It will be apparent that the figures described herein are merely examples of certain embodiments of the present disclosure, and other figures can be obtained by those skilled in the art without engaging in inventive effort based on these figures.

To comprehensively understand the present disclosure and its advantages, the following description will be provided with reference to the figures, wherein identical reference numerals denote identical components throughout the drawings.

Figure 1:
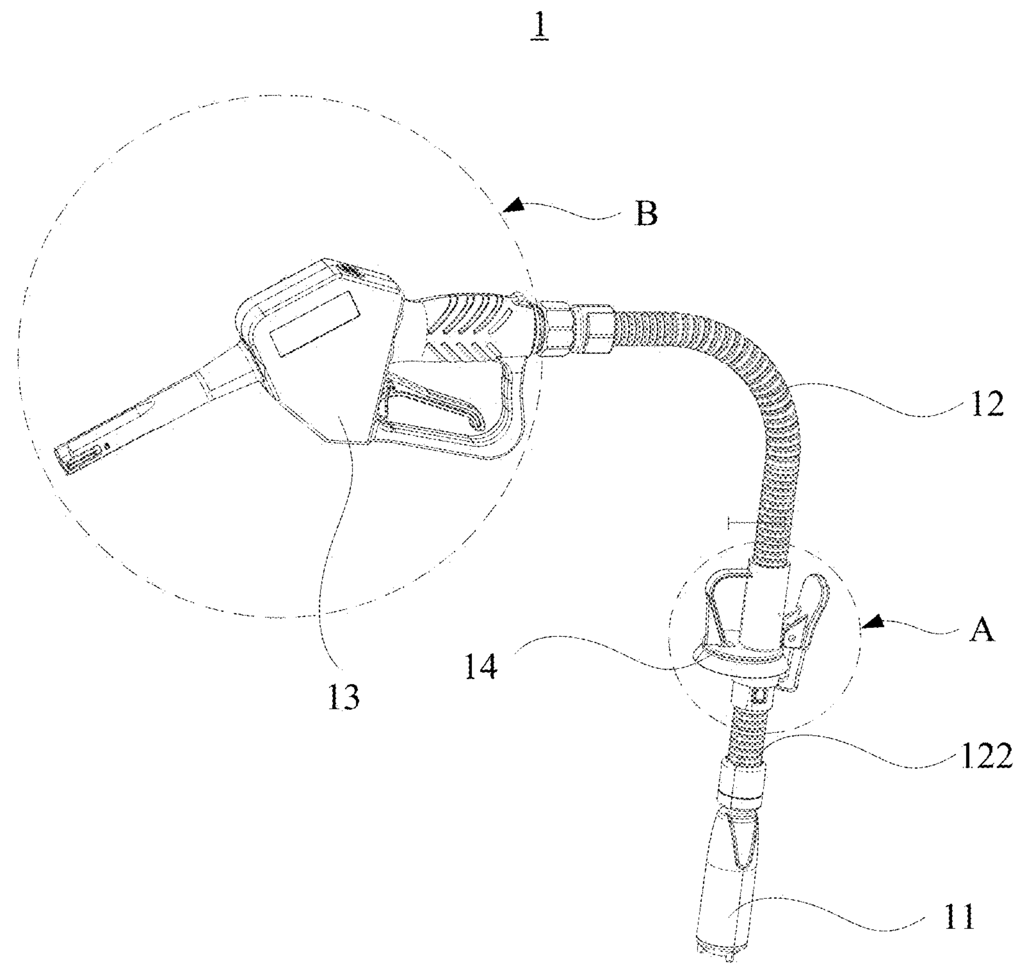
FIG. 1 is a schematic structural diagram of the liquid pumping device provided by an embodiment of the present disclosure.

The reference signs in the drawings are explained as follows:

1: liquid pumping device;

11: pump body;

12: pipe; 121: positioning grooves; 122: expandable portion;

13: grip portion; 131: operating lever; 132: automatic control circuit; 1322: sensor; 1324: control circuit; 133: control switch; 134: grip; 135: base; 136: liquid refill tube;

14: mounting portion; 142: connecting portion; 1422: sleeve portion; 1423: perforated opening; 1424: spring tab; 1425: snap-fitting portion; 144: clamping portion; 146: flexible cover; 148: handle;

2: container; 21: outlet; 22: annular wall.

DETAILED DESCRIPTION OF EMBODIMENTS

The technical solutions of the embodiments of the present disclosure will be described clearly and completely below with reference to the accompanying drawings of the embodiments. Obviously, the described embodiments are part of the embodiments of the present disclosure, not all of them. The following description of at least one exemplary embodiment is actually only illustrative and in no way constitutes any limitation on the present disclosure and its application or use. Based on the embodiments in the present disclosure, all other embodiments obtained by those skilled in the art without engaging in inventive effort fall within the protection scope of the present disclosure.

Mentioning "embodiments" in this document means that the specific features, structures, or characteristics described in conjunction with the embodiments may be included in at least one embodiment of the present disclosure. The occurrence of this phrase in various places in the specification does not necessarily refer to the same embodiment, nor is it an independent or alternative embodiment exclusive of other embodiments. It is explicitly and implicitly understood by those skilled in the art that the embodiments described herein can be combined with other embodiments.

Figure 2:
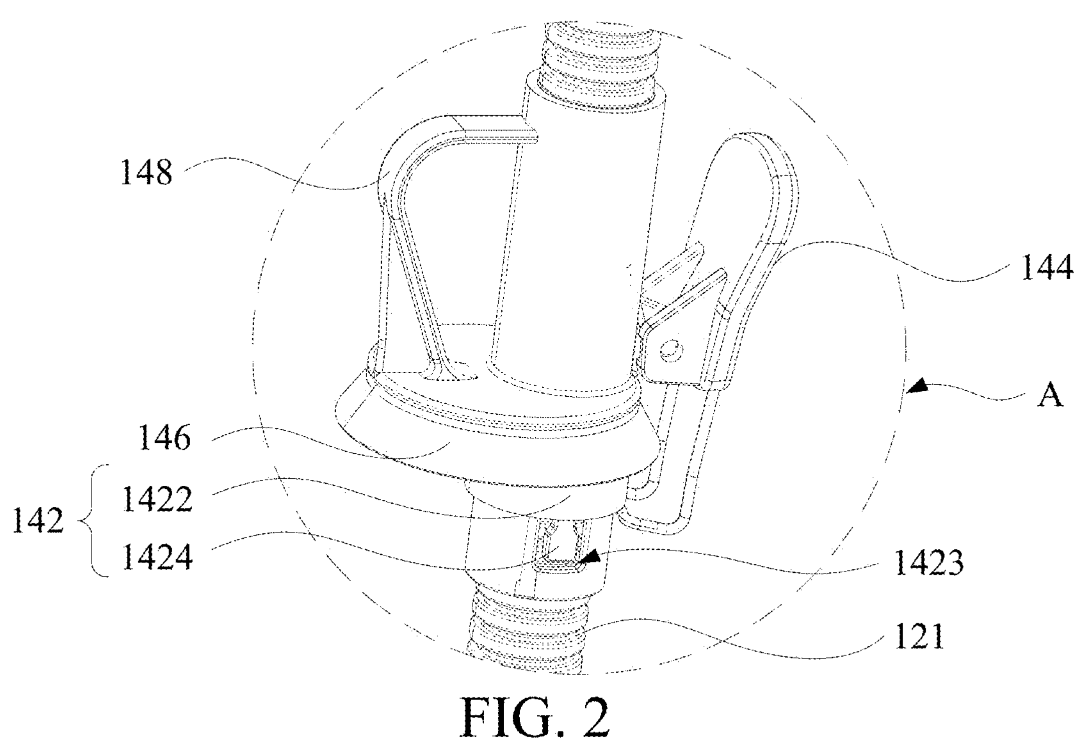
FIG. 2 is an enlarged schematic view of section A of the liquid pumping device shown in FIG. 1.

Please refer to FIG. 1 and FIG. 2. FIG. 1 is a structural schematic diagram of a liquid pumping device provided by the embodiments of the present disclosure, and FIG. 2 is a structural schematic diagram of a liquid refilling apparatus provided by the embodiments of the present disclosure. An embodiment of the present disclosure provides a liquid pumping device 1, which includes a pump body 11, a pipe 12, a grip portion 13, and a mounting portion 14. The pump body 11 is configured to be disposed within a container 2 to pump liquid from the container 2. The pipe 12 is connected to the pump body 11 to transport the liquid. The grip portion 13 is connected to a distal end of the pipe 12 away from the pump body 11. The grip portion 13 is connected to the pump body 11 and is capable of controlling the pump body 11. The mounting portion 14 is mounted on the pipe 12. The mounting portion 14 and the pump body 11 are positioned at different locations along the pipe 12. The length of a portion of the pipe 12 between the mounting portion 14 and the pump body 11 is variable. The mounting portion 14 is configured to be detachably mounted on the container 2.

In the embodiments of the present disclosure, the pump body 11 performs liquid pumping, while the pipe 12 serves as a liquid-transporting pipeline to guide the pumped liquid from the pump body 11 outside the container 2. The grip portion 13, connected to the distal end of the pipe 12, not only provides a convenient holding point for the user but also enables direct or indirect control over the pump body's activation, deactivation, and operational status through functional interaction with the pump body 11, thereby enhancing operational convenience. The liquid pumping device 1 further includes the mounting portion 14, which is spaced apart from the pump body 11 along the longitudinal direction of the pipe 12. The pipe segment between the mounting portion 14 and the pump body 11 features a variable effective length. This variable length feature allows users to flexibly adjust the pump body's insertion depth into the container during operation. Regardless of the container's depth, the pump body can be adjusted to reach target positions such as the container bottom, to ensure efficient liquid pumping while avoiding incomplete extraction or air ingress caused by pump body suspension.

Additionally, the mounting portion 14 is detachably mounted on the container 2, such as by clamping or other methods achieving temporary yet rigid fixation. This design introduces an extra stability support point for the liquid pumping device 1. When synergized with the grip portion 13, it effectively prevents the pump body 11 displacement or collision with the container 2 during pumping caused by pipe movement. Furthermore, the detachable mounting mechanism simplifies the assembly/disassembly process. When switching containers 2 or relocating the pumping position, users can quickly detach the liquid pumping device 1 from the current container 2, significantly enhancing usability and operational efficiency.

Therefore, the liquid pumping device 1 provided by the present disclosure achieves flexible adaptation to containers 2 of varying depths through the variable length of the pipe 12 between the mounting portion 14 and the pump body 11, ensuring the pump body 11 remains in an effective working position. Simultaneously, the mounting portion 14 is detachably mounted on the container 2, enabling rapid installation/removal while providing stable support during operation. Combined with the grip portion 13 that directly controls the pump body 11, the entire liquid pumping device 1 offers convenient and efficient operation with enhanced stability.

It should be understood that the container 2 may be a barrel, enclosure, tank, or cassette, etc. The liquid may be configured as needed, such as gasoline, diesel, kerosene, or other solvents. The liquid refilling apparatus can add liquid to fuel tanks of automobiles, motorcycles, yachts, lawn tractors, and similar equipment. For example, the liquid pumping device 1 may function as a gas pump, with the container 2 serving as an oil drum.

In some embodiments, the mounting portion 14 is movably connected to the pipe 12, and the mounting portion 14 is capable of being relatively moved along the pipe 12 to be positioned at different locations of the pipe 12.

In these embodiments, by configuring the mounting portion 14 and the pipe 12 as movably connected, the mounting portion 14 can be moved along the longitudinal direction of the pipe 12 and be fixed at different positions, thereby achieving flexible adjustment of the pipe segment's length between the mounting portion 14 and the pump body 11. Exemplarily, the mounting portion 14 is sleeved around the outer periphery of the pipe 12, and an inner wall of the mounting portion 14 forms a sliding fit structure with an outer wall of the pipe 12. To ensure operational stability, the mounting portion 14 may be provided with a locking/unlocking mechanism. When adjustment is required, the user operates the locking/unlocking mechanism to unlock the mounting portion 14, allowing it to slide axially along the pipe 12 to a target position, such as positioning the pump body 11 to precisely reach the bottom of the current container 2. After reaching the target position, operating the locking/unlocking mechanism again secures the mounting portion 14 firmly to the pipe 12.

Therefore, when the mounting portion 14 is in the unlocked state, it can freely slide relative to the pipe 12 for rapid positioning; when locked, the relative position between the mounting portion 14 and the pipe 12 is fixed, thereby ensuring stability during liquid pumping operations. Through these simple sliding, unlocking, and locking operations, users can precisely and rapidly adjust the working depth of the pump body 11 within the container 2 without tools, enabling the liquid pumping device 1 to accommodate containers 2 of varying depths from shallow to deep. This not only enhances operational convenience and efficiency but also effectively prevents performance fluctuations or liquid leakage caused by displacement of the mounting portion 14 during use. The reliable locking mechanism ensures stability and safety throughout the pumping process.

Figure 3:
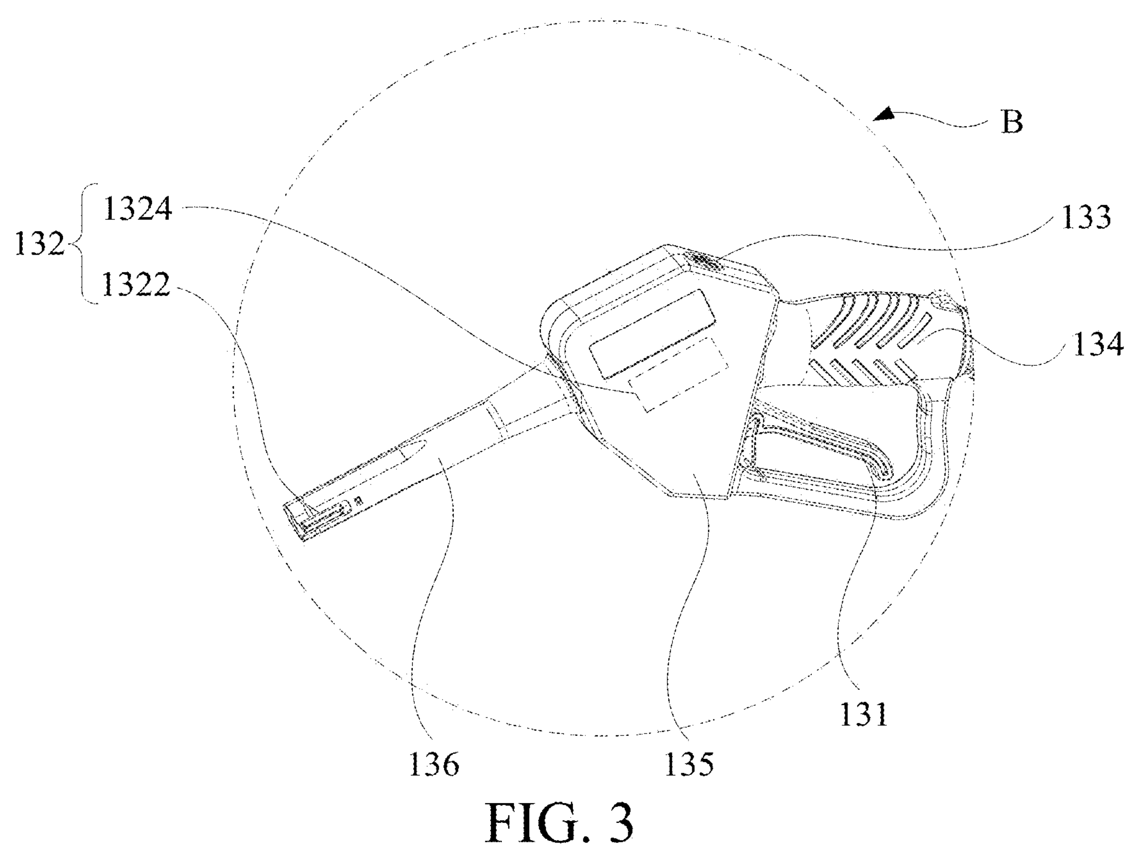
FIG. 3 is an enlarged schematic view of section B of the liquid pumping device shown in FIG. 1.

Referring to FIG. 3, which is an enlarged schematic view of section A of the liquid pumping device shown in FIG. 1. In some embodiments, the mounting portion 14 includes a connecting portion 142 and a clamping portion 144 interconnected with each other. The connecting portion 142 is movably connected to the pipe 12, and the clamping portion 144 clamps the container 2.

In this embodiment, the connecting portion 142 is movably connected to the pipe 12, enabling the entire mounting portion 14 to move relative to the pipe 12 and be fixed at different positions, thereby achieving adjustment of the working depth of the pump body 11. The clamping portion 144 is configured to clamp the container 2. Exemplarily, the clamping portion 144 may adopt a clamp structure that can be opened to accommodate different thicknesses of a rim or edge of the container 2, generating sufficient clamping force when tightened to securely anchor the entire liquid pumping device 1 onto the container 2. This clamping mechanism is independent of specific threads or dimensions of mechanical interfaces of the container 2, thus offering broad applicability. The mounting portion 14 can thus adapt to containers 2 of varying diameters and shapes without requiring specialized fastening fittings for different containers 2, resolving installation challenges caused by inconsistent container 2 port configurations. Therefore, through the synergistic operation of the connecting portion 142 and clamping portion 144 in this embodiment, the mounting portion 14 achieves both ease of adjustment/positioning and provides a stable additional support point for the liquid pumping process, independent of manual handling.

It should be noted that the clamping portion 144 may alternatively be replaced with other structures mounted on the container 2. For example, the clamping portion 144 can be substituted with a suction cup adsorbed onto the surface of the container 2, a magnetic structure adhered to the container 2 (e.g., a magnet is configured on one of the clamping portions 144 and the container 2, and a magnetic component or ferromagnetic material is configured on the other), or a snap-fit structure or other methods capable of achieving detachable active mounting. These methods can all enable the convenient fixation of the mounting portion 14 onto the container 2.

In some embodiments, the clamping portion 144 is configured to clamp an annular wall 22 surrounding an outlet 21 of the container 2.

In this embodiment, the clamping portion 144 does not rely on specific structures of the outlet 21 of the container 2, such as specific threads or protrusions, but instead is securely attached to the annular wall 22 around the outlet 21 of the container 2 solely through its inherent clamping force.

This clamping method avoids compatibility issues caused by the varied interface specifications of the container 2. Regardless of the size or shape of the outlet 21 of the container 2, as long as the annular wall 22 can be effectively clamped by the clamping portion 144, a stable and reliable fixation point is provided for the entire liquid pumping device 1. The user does not need to search for or switch any dedicated adapter; instead, simply perforate the opening and clamp the clamping portion 144 like a clamp onto the edge of the outlet 21 of the container 2 completes the rapid installation. This method of clamping the annular wall 22 not only ensures the stability of the mounting portion 14, preventing accidental shaking or detachment of the pump body 11 during liquid pumping, but also enables compatibility with the vast majority of common containers 2. Consequently, it enhances the universality and ease of operation of the liquid pumping device 1, thereby improving user experience.

In some embodiments, the connecting portion 142 is sleeved over the pipe 12 and slidable relative to the pipe 12, the connecting portion 142 includes at least one spring tab 1424, and the spring tab 1424 elastically abuts the pipe 12 to form a snap-fit engagement.

Exemplarily, the connecting portion 142 includes a sleeve portion 1422 and the spring tab 1424 configured thereon. Wherein, the sleeve portion 1422 is directly sleeved over the outer periphery of the pipe 12, providing a sliding fit foundation with the pipe 12. The sleeve portion 1422 is provided with a perforated opening 1423, within which the spring tab 1424 is configured. Furthermore, one end of the spring tab 1424 is connected to the main body of the sleeve portion 1422.

Figures 4, 5:
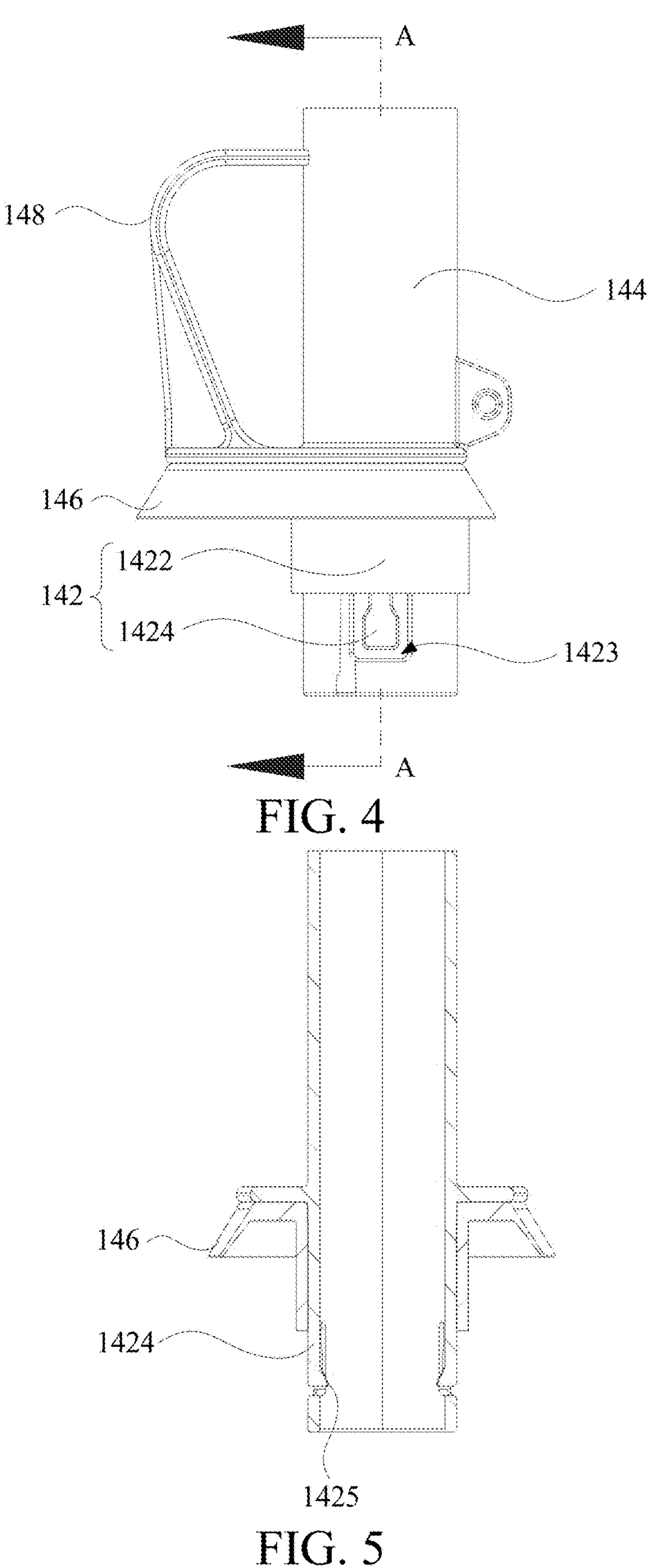
FIG. 4 is a structural schematic diagram of the mounting portion of the liquid pumping device shown in FIG. 1.
FIG. 5 is a cross-sectional view of the mounting portion shown in FIG. 4 along the AA direction.

Correspondingly, referring to FIG. 4 and FIG. 5, FIG. 4 is a structural schematic diagram of the mounting portion 14 in the liquid pumping device 1 shown in FIG. 1, and FIG. 5 is a cross-sectional view of the mounting portion 14 along the AA direction shown in FIG. 4. The pipe 12 is provided with a plurality of positioning grooves 121 along its longitudinal direction. The other end of the spring tab 1424 is provided with a snap-fitting portion 1425 protruding toward the pipe 12. The snap-fitting portion 1425 is capable of snapping into different positioning grooves 121, thereby positioning the mounting portion 14 at different locations on the pipe 12.

In this embodiment, the sleeve portion 1422 is sleeved over the outer periphery of the pipe 12, forming a sliding fit foundation with the pipe 12. The sleeve portion 1422 is provided with a perforated opening 1423, within which the spring tab 1424 is configured. Since one end of the spring tab 1424 is fixedly connected to the sleeve portion 1422, while the other end is free, the spring tab 1424 is capable of undergoing elastic deformation at the fixed end when subjected to force, thereby enabling switching between a locked state and an unlocked state with respect to the outer wall of the pipe 12.

Specifically, when the mounting portion 14 slides along the pipe 12, the snap-fitting portion 1425 on the spring tab 1424 is capable of sequentially sliding over the positioning grooves 121 on the surface of the pipe 12 under the elastic action of the spring tab 1424. When the mounting portion 14 moves to a target position, the snap-fitting portion 1425, under the restoring force of the spring tab 1424 itself, is precisely snapped into the corresponding positioning groove 121 at that position. By snapping the snap-fitting portion 1425 into different positioning grooves 121, the mounting portion 14 can be stably positioned at different axial locations along the pipe 12, thereby achieving precise and reliable positioning of the mounting portion 14 and effectively preventing slow slippage or accidental displacement during the liquid pumping process.

In an exemplary operational process, a user applies an external force to slide the mounting portion 14 relative to the pipe 12. The spring tab 1424 on the mounting portion 14 deforms to disengage the snap-fitting portion 1425 from the currently engaged positioning groove 121, allowing the mounting portion 14 to slide along the pipe 12. After the external force is removed, the spring tab 1424 utilizes its inherent elastic restoring force to push the snap-fitting portion 1425 into the positioning groove 121 corresponding to the target position. This action achieves a mechanical interlock between the connecting portion 142 and the pipe 12 at the target location, thereby securing the connecting portion 142 firmly in place.

In another exemplary operational process, when a user applies an external force to the spring tab 1424 to induce elastic deformation, the snap-fitting portion 1425 disengages from the currently engaged positioning groove 121. At this point, the connecting portion 142 enters an unlocked state, allowing the user to effortlessly slide the entire mounting portion 14 axially along the pipe 12 until reaching the target position. Once the mounting portion 14 is slid to the target position (e.g., positioning the pump body 11 to precisely contact the bottom of the container 2), the user simply removes the external force from the spring tab 1424. The spring tab 1424, leveraging its inherent elastic restoring force, pushes the snap-fitting portion 1425 into the positioning groove 121 corresponding to the target position. This action establishes a mechanical interlock between the connecting portion 142 and the pipe 12 at the target location, thereby securing the connecting portion 142 firmly in place.

In an exemplary operational process, the sleeve portion 1422 of the connecting portion 142 and the spring tab 1424 may be manufactured as an integral component, for example, through an injection molding process to integrally form the parts. This approach simplifies the manufacturing workflow, reduces the number of components, and lowers assembly complexity and costs. Simultaneously, the design of the perforated opening 1423 ensures that the spring tab 1424 retains sufficient operational space and elastic travel while avoiding structural instability or wear issues caused by additional supplementary parts, thereby enhancing durability. Furthermore, the sleeve portion 1422 and spring tab 1424 may also be processed separately, and this embodiment does not impose restrictions on this aspect.

In some embodiments, the mounting portion 14 further includes a flexible cover 146 connected to the connecting portion 142, the flexible cover 146 surrounds the connecting portion 142 and is configured to enclose the outlet 21 of the container 2.

In this embodiment, the primary function of the flexible cover 146 is to provide effective shielding protection for the outlet 21 of the container 2. When the mounting portion 14 is fixed to the container 2 via its connecting portion 142 and clamping portion 144, the flexible cover 146 can simultaneously cover the outlet 21 of the container 2. This design effectively prevents external contaminants (e.g., dust, debris) from entering the interior of the container 2 through the open outlet 21, thereby maintaining the cleanliness of the liquid inside the container 2 and avoiding potential oil passage blockage or equipment failure caused by impurities. The integration of the flexible cover 146 ensures that the outlet 21 of the container 2 remains protected during the liquid pumping operation of the liquid pumping device 1. This feature is particularly critical for liquid pumping devices 1 used in harsh environments such as outdoor or construction sites, significantly enhancing the safety and hygiene of the liquid pumping device 1 during use.

In some embodiments, the mounting portion 14 further includes a handle 148 connected to the connecting portion 142. The handle 148 is configured to drive the mounting portion 142 to slide under external force.

In this embodiment, the handle 148 provides users with a clear and ergonomic force application point. When adjusting the position of the mounting portion 14, users do not need to exert force to grip structures such as the connecting portion 142 or sleeve portion 1422. Instead, they can naturally grasp or pinch the handle 148 to perform operations. The configuration of the handle 148 ensures more stable gripping, more direct force application, and precise control during the unlocking, sliding, and re-locking sequence of adjustment actions. This design enables the entire liquid pumping device's adaptation process to containers 2 of varying depths to be simpler and more efficient, achieving tool-free, single-handed operation for the liquid pumping device 1, thereby enhancing operational convenience and user experience.

In some embodiments, the mounting portion 14 is detachably mounted on the pipe 12, enabling removable installation and securement at any position along the pipe 12.

In this embodiment, the mounting portion 14 is configured to be removably mounted on the pipe 12. Exemplarily, the mounting portion 14 can be detached and reattached to the pipe 12 via specific connection structures (e.g., snap-fit, interference fit, binding mechanisms). When adjusting the effective working depth of the pump body 11 within the container 2, the user may first detach the entire mounting portion 14 from the pipe 12, then reinstall it at another suitable position on the pipe 12 that is closer to or farther from the pump body 11 based on the target depth, and finally secure the mounting portion 14 to the container 2. This removable-and-reinstallable adjustment method provides high adjustment freedom, enabling users to perform large-distance, non-continuous positional adjustments across the entire length of the pipe 12. The fully detachable design allows complete physical separation between the mounting portion 14 and the corresponding pipe segment, which not only facilitates cleaning, maintenance, or component replacement but also simplifies the packaging and transportation of the liquid pumping device 1.

In some embodiments, the pipe 12 includes an expandable portion 122 between the mounting portion 14 and the pump body 11, and the expandable portion 122 having an adjustable length.

In this embodiment, the expandable portion 122 is a specific region with telescoping or folding capabilities. Exemplarily, the implementation may include, but is not limited to, a corrugated pipe structure or a telescoping pipe structure formed by multi-layer nested pipe segments of the pipe 12, which are capable of relative sliding through interlocking mechanisms.

By adjusting the length of the expandable portion 122, the effective pipe length between the mounting portion 14 and the pump body 11 can be directly modified, enabling precise control over the operational depth of the pump body 11 within the container 2. For instance, when addressing deeper containers 2, the expandable portion 122 is extended to its maximum length; conversely, for shallower containers 2, the expandable portion 122 is compressed to a minimum configuration.

In this embodiment, since the adjustment mechanism is integrally embedded within the pipe 12, it eliminates the reliance on sliding and locking mechanisms between the mounting unit 14 and the pipe 12, or the need to detach the mounting unit 14 from the pipe 12. Users can directly manipulate the expandable portion 122 to achieve depth adjustment, ensuring user-friendly operation. The expandable portion 122 (e.g., a corrugated pipe), inherently possessing high flexibility, significantly enhances the adaptability of the pipe 12 in complex operating environments. Consequently, this embodiment provides a direct pipe-length adjustment solution for the pipe 12, expanding the compatibility of the liquid pump 1 with containers 2 of varying depths.

It should be noted that the pipe 12 may be configured in various types as required. For instance, the pipe 12 may be a corrugated hose, a smooth hose (with at least one of its inner or outer surfaces being smooth), a transparent hose, a smooth and transparent pipe, or a rigid pipe.

Figure 6:
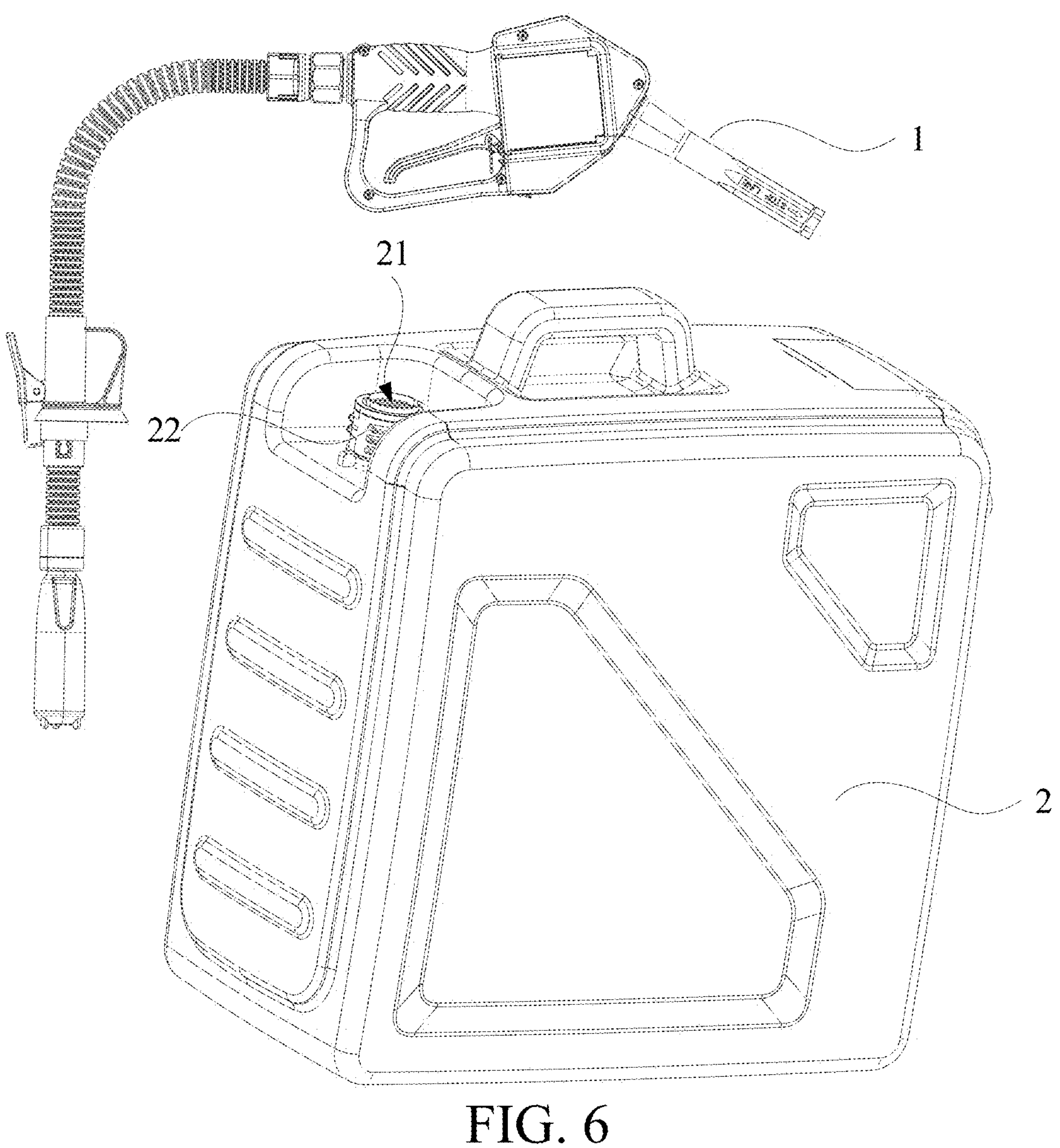
FIG. 6 is a schematic structural diagram of the liquid refilling apparatus provided by an embodiment of the present disclosure.

With reference to FIG. 6, FIG. 6 is an enlarged view of Section B of the liquid pumping device 1 shown in FIG. 1. In some embodiments, the grip portion 13 includes an operating lever 131 and an automatic control circuit 132. The operating lever 131 is manually operable by external force to control the opening and closing of the liquid-transporting pipeline, and the automatic control circuit 132 is configured to automatically start/stop the pump body 11.

In this embodiment, the operating lever 131 functions as a mechanical control component that responds to manual force (e.g., pressing, levering) applied by the user, generating displacement or state changes. This mechanical motion is transmitted or converted into control signals to regulate the opening/closing of the liquid-transporting pipeline or directly control the activation/deactivation of the pump body 11, providing users with intuitive manual operation. Within the operating lever 131, there is provided a conduit connected to the pipe 12. This conduit also transports liquid, and the opening or closing of the conduit can be controlled by operating the operating lever 131.

Furthermore, the grip portion 13 integrates an automatic control circuit 132 capable of automatically monitoring specific conditions during liquid pumping (e.g., detecting when the liquid reaches full capacity). Upon satisfying predefined thresholds, the circuit issues commands to activate/deactivate the pump body 11, thereby eliminating or reducing manual intervention.

By integrating the operating lever 131 and the automatic control circuit 132 together in the grip portion 13, the device has both manual and automatic dual control capabilities, allowing users to flexibly choose the control mode during operation: they can use the operating lever 131 to actively control the on/off function to meet the needs of temporary interruption or precise flow control; or they can rely on the automatic control circuit 132 to achieve automated operation of "stop when full" to prevent liquid spillage. This combination of manual and automatic control greatly enhances the convenience, flexibility, and safety of the operation of the liquid pumping device 1, and can meet the operation habits of different users and the requirements of different application scenarios at the same time. It should be noted that the grip portion 13 may also include only the operating lever 131 or only the automatic control circuit 132, and this embodiment does not impose any restrictions on this.

In some embodiments, the grip portion 13 further includes a control switch 133. The control switch is configured to be triggered by an external force to control the operating state of the liquid pumping device 1, wherein the operating state includes a working state and a stopped state.

In this embodiment, the control switch 133 is capable of responding to external trigger operations by the user (such as pressing, toggling, etc.) To directly control the working and stopped states of the liquid pumping device 1, thereby enhancing operational safety and the directness of control. Exemplarily, when the user triggers the switch to the "working state", the entire liquid pumping device 1 is powered on, causing it to enter the operational mode; whereas when triggered to the "stopped state", the main power supply of the liquid pumping device 1 is immediately cut off, causing it to cease operation.

By integrating the start/stop control of the liquid pumping device 1 into the grip portion 13, the user can easily access and operate the control switch 133 while holding the device, which is beneficial for handling emergency situations. When an immediate cessation of the liquid pumping operation is required, the user does not need to search for a switch in another location but can quickly cut off the power directly on the grip portion 13, thereby shortening the emergency response time and enhancing the reliability of the liquid pumping device 1 under various operating conditions.

In some embodiments, the grip portion 13 further includes a grip 134 and a base 135, wherein the base 135 is connected to the pipe 12 via the grip 134. The operating lever 131 is movably mounted on the base 135 and is located on the same side of the base 135 as the grip 134. The control switch 133 is configured on the base 135 and proximate to the grip 134.

This embodiment establishes a logically clear and user-friendly control center within the limited space of the grip portion 13. Specifically, the two most critical manual control elements, the operating lever 131 and the control switch 133, are centrally arranged in the operational area near the grip 134. This allows users to effortlessly reach and operate both components while holding the grip 134 with one hand during liquid pumping operations. Whether performing precise flow control via the operating lever 131 or quickly triggering the control switch 133 to cut power in emergencies, the required actions can be completed swiftly without altering the grip or using the other hand. It should be understood that the grip 134 and the base 135 contain fluid-conducting channels connected to the pipe 12.

In some embodiments, the grip portion 13 further includes a liquid refill tube 136 configured for outputting liquid. The liquid refill tube 136 is connected to a side of the base 135 away from the grip 134. The automatic control circuit 132 includes a control circuit 1324 and a sensor 1322 electrically connected to the control circuit 1324. The control circuit 1324 is electrically connected to the pump body 11. The sensor 1322 is installed at a front end of the liquid refill tube 136 and configured to detect the quantity of liquid output. The control circuit 1324 controls the start and stop of the pump body 11 based on the detected liquid quantity.

In this embodiment, by installing the sensor 1322 on the liquid refilling tube 136 at its front end, where the liquid refilling tube 136 outputs liquid, the automatic control circuit 132 can obtain real-time, direct status information of the output liquid. The control circuit 1324 can automatically determine and control the operation of the pump body 11 based on liquid quantity parameters detected by the sensor 1322 through multiple methods: for example, by calculating the total output through cumulative flow measurement, or by indirectly determining the liquid level height of the target container 2 through monitoring the liquid level status at the outlet 21 of the liquid refilling tube 136, or by triggering the sensor when the liquid level contacts the sensor surface. When the control circuit 1324 determines based on signals from the sensor 1322 that the liquid has reached full capacity, it will automatically cut off power to the pump body 11 to stop the pumping operation. This enhances operational safety and convenience while effectively preventing waste and safety hazards caused by liquid spillage. Exemplarily, the automatic control circuit 132 may also include components such as a processing unit and corresponding control logic, which are not limited in this embodiment.

The liquid transfer device 1 may include one or more power supply configurations. For example, the device 1 may include at least one of the following: a battery power supply, a USB Type-C port power supply, or a DC 12V adapter port power supply. The battery may be a primary battery or a rechargeable battery. To prevent simultaneous use of the USB Type-C port and the DC 12 V adapter port and to enhance product safety, a swing plate is provided at the two ports. The swing plate is movable relative to the ports and is configured to expose one port while covering the other port, such that only one of the two ports is exposed at a time. When one port is in use, the swing plate covers the other port, providing a protective effect.

Referring to FIGS. 1 to 6, the present disclosure further provides a liquid refilling apparatus including a container 2 and a liquid pumping device 1. The container 2 is configured to store liquid, and the liquid pumping device 1 is mounted on the container 2 and configured to output liquid from the container 2. The liquid pumping device 1 may be any one of the liquid pumping devices 1 described in the aforementioned embodiments, which will not be reiterated herein.

In some embodiments, the container 2 is provided with an outlet 21. The container 2 has an annular wall 22 protruding outward and surrounding the outlet 21. The mounting portion 14 of the liquid pumping device 1 clamps the annular wall 22.

In this embodiment, the mounting portion 14 does not rely on specific structures of the outlet 21 of the container 2, such as specific threads or protrusions, but instead is securely attached to the annular wall 22 around the outlet 21 of the container 2 solely through its inherent clamping force. This clamping method avoids compatibility issues caused by the varied interface specifications of the container 2. Regardless of the size or shape of the outlet 21 of the container 2, as long as the annular wall 22 can be effectively clamped by the clamping portion 144, a stable and reliable fixation point is provided for the entire liquid pumping device 1. The user does not need to search for or switch any dedicated adapter; instead, simply perforate the opening and clamp the clamping portion 144 like a clamp onto the edge of the outlet 21 of the container 2 completes the rapid installation. This method of clamping the annular wall 22 not only ensures the stability of the mounting portion 14, preventing accidental shaking or detachment of the pump body 11 during liquid pumping, but also enables compatibility with the vast majority of common containers 2. Consequently, it enhances the universality and ease of operation of the liquid pumping device 1, thereby improving user experience.

It should be understood that the container 2 may be a barrel, enclosure, tank, or cassette, etc. The liquid may be configured as needed, such as gasoline, diesel, kerosene, or other solvents. The liquid refilling apparatus can add liquid to fuel tanks of automobiles, motorcycles, yachts, lawn tractors, and similar equipment. For example, the liquid pumping device 1 may function as a gas pump, with the container 2 serving as an oil drum.

The descriptions of various embodiments provided above each emphasize different aspects. For details not comprehensively discussed in a particular embodiment, reference may be made to the corresponding descriptions in other embodiments. The embodiments, implementation modes, and related technical features of the present disclosure may be combined or substituted with each other where there is no conflict.

The foregoing detailed description has provided specific examples of the liquid pumping device and liquid refilling apparatus according to the embodiments of the present disclosure, illustrating the principles and implementation modes of the present disclosure. These embodiments are merely intended to facilitate understanding of the methods and core concepts of the present disclosure. For those skilled in the art, various modifications in specific implementation modes and application scopes may be made based on the concepts of the present disclosure. Accordingly, the content of this specification should not be construed as limiting the scope of the present disclosure.

What is claimed is:

1. A liquid pumping device, comprising:

a pump body conFIGured to be disposed within a container for pumping liquid from the container;

a pipe connected to the pump body for transporting the liquid;

a grip portion connected to a distal end of the pipe away from the pump body, wherein the grip portion is connected to the pump body and is capable of controlling the pump body; and a mounting portion mounted on the pipe, wherein the mounting portion and the pump body are positioned at different locations along the pipe, a length of a pipe segment between the mounting portion and the pump body is variable, the mounting portion is conFIGured to be detachably mounted on the container.

2. The liquid pumping device according to claim 1, wherein the mounting portion is movably connected to the pipe, and the mounting portion is capable of being relatively moved along the pipe to be positioned at different locations.

3. The liquid pumping device according to claim 1, wherein the mounting portion comprises a connecting portion and a clamping portion interconnected with each other, the connecting portion is movably connected to the pipe, and the clamping portion clamps the container.

4. The liquid pumping device according to claim 3, wherein the clamping portion is conFIGured to clamp an annular wall surrounding an outlet of the container.

5. The liquid pumping device according to claim 3, wherein the connecting portion is sleeved over the pipe and slidable relative to the pipe, the connecting portion comprises at least one spring tab, and the spring tab elastically abuts the pipe to form a snap-fit engagement.

6. The liquid pumping device according to claim 5, wherein the connecting portion comprises a sleeve portion and the spring tab, the sleeve portion is sleeved over the pipe and defines perforated openings therein, and the spring tab is conFIGured within the perforated openings and has one end connected to the sleeve portion.

7. The liquid pumping device according to claim 6, wherein the pipe comprises a plurality of positioning grooves along its longitudinal direction, the spring tab has a snap-fitting portion protruding towards the pipe from the other end, and the engagement protrusion is conFIGured to snap into different positioning grooves to position the mounting portion at various locations along the pipe.

8. The liquid pumping device according to claim 5, wherein the mounting portion further comprises a flexible cover connected to the connecting portion, the flexible cover surrounds the connecting portion and is conFIGured to enclose the container's outlet.

9. The liquid pumping device according to claim 3, wherein the mounting portion further comprises a handle connected to the connecting portion, and the handle is conFIGured to drive the mounting portion to slide under external force.

10. The liquid pumping device according to claim 1, wherein the mounting portion is detachably mounted on the pipe, enabling removable installation and securement at any position along the pipe.

11. The liquid pumping device according to claim 1, wherein the pipe comprises a expandable portion between the mounting portion and the pump body, the expandable portion having an adjustable length.

12. The liquid pumping device according to claim 1, wherein the grip portion comprises an operating lever and an automatic control circuit, the operating lever is manually operable by external force to control the opening and closing of the liquid-transporting pipeline, and the automatic control circuit is conFIGured to automatically start/stop the pump body.

13. The liquid pumping device according to claim 12, wherein the grip portion further comprises a control switch conFIGured to be triggered by an external force to control the operating state of the liquid pumping device, and the operating state comprises a working state and a stopped state.

14. The liquid pumping device according to claim 13, wherein the grip portion comprises a grip and a base connected to the pipe via the grip, the operating lever is movably mounted on the base, the operating lever and the grip are both located on the same side of the base, and the control switch is conFIGured on the base and proximate to the grip.

15. The liquid pumping device according to claim 14, wherein the grip portion further comprises a liquid refill tube for outputting liquid, the liquid refill tube is connected to a side of the base away from the grip, the automatic control circuit comprises a control circuit and a sensor electrically connected to the control circuit, the sensor is installed at a front end of the liquid refill tube and conFIGured to detect the quantity of liquid output, and the control circuit controls the start and stop of the pump body based on the detected liquid quantity.

16. A liquid refilling apparatus, comprising:

a container for storing liquid; and a liquid pumping device as claimed in claim 1, wherein the liquid pumping device is mounted on the container and conFIGured for outputting liquid from the container.

17. The liquid refilling apparatus according to claim 16, wherein the container defines an outlet and an annular wall surrounding the outlet and protruding outward, and the mounting portion of the liquid pumping device clamps the annular wall.

* * * * *